June 17, 1969 M. B. KNIGHT 3,450,936

TELEVISION SCANNING AND POWER SUPPLY SYSTEM

Filed June 12, 1967

INVENTOR
MARK BERWYN KNIGHT

BY William H. Meagher

ATTORNEY 3,450,936

TELEVISION SCANNING AND POWER SUPPLY SYSTEM

Mark Berwyn Knight, North Caldwell, N.J., assignor to Radio Corporation of America, a corporation of Delaware Filed June 12, 1967, Ser. No. 645,258

Int. Cl. H01j 29/70

U.S. Cl. 315—27 8 Claims

ABSTRACT OF THE DISCLOSURE

In transistorized horizontal deflection output circuit, damper diode is "tapped up" on output transformer primary relative to output transistor collector drive point. By providing a D.C. load in the output transistor emitter circuit, a D.C. operating potential of the order required by low power stages of a television receiver is conveniently developed at the emitter. Degree of "tapping up" of damper determines magnitude of supply potential developed at emitter. In one circuit arrangement, supply in emitter circuit also serves as source of centering current to horizontal deflection windings, D.C.-to-D.C. transformer action of output circuit permits design of receiver's low voltage power supply without need for power transformer.

Figure 1:
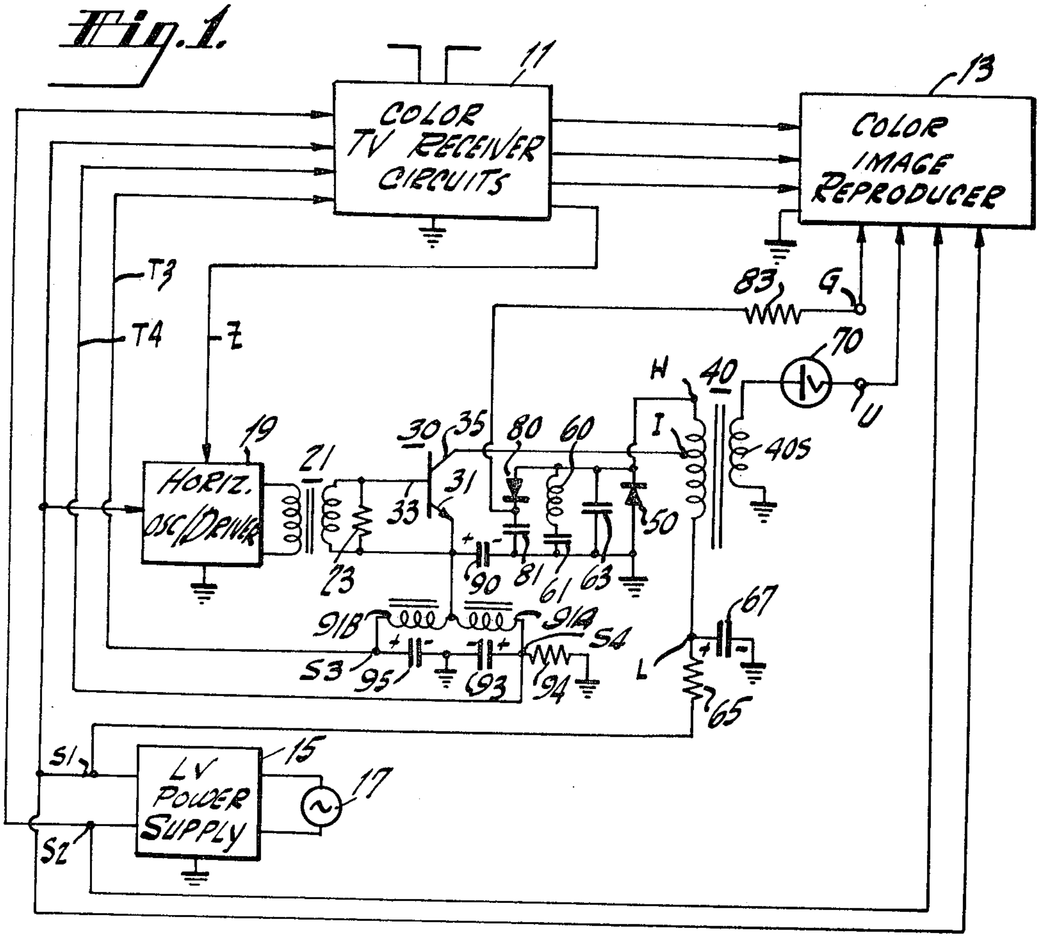

The present invention relates generally to television receiver circuitry, and particularly to television scanning circuit arrangements which facilitates the provision of unidirectional operating potentials for other receiver sections.

In transistorized monochrome or color television receivers, it is usually necessary that the low voltage power supply section of the receiver provide several relatively high operating potential outputs (e.g., voltages of the order of 125 volts and 230 volts, mainly for operation of power output stages), as well as a relatively low operating potential output (e.g., of the order of 20 volts, for operating stages performing most of the low-power receiver functions). It is desirable, in consideration of factors of cost, weight and volume, to avoid the use of a power transformer in the low voltage power supply section, but such avoidance is difficult if the above-noted power supply requirements are to be met efficiently. In accordance with the principles of the present invention, a television scanning circuit arrangement is provided in which the deflection output circuit effectively performs an additional function as a D.C.-to-D.C. transformer, enabling derivation of an operating potential for the low power receiver stages from the deflection circuitry, thereby removing the demand on the low voltage power supply section for outputs other than in the relatively high potential range. Under such circumstances a "transformerless" low voltage power supply section is feasible.

In accordance with an embodiment of the present invention, the damper diode associated with the deflection output circuit is "tapped up" on the deflection output transformer relative to the deflection output transistor's drive connection thereto, and the D.C. load represented by the low-power receiver stages is inserted in the emitter circuit of the output transistor. A portion of the power developed in the aforesaid emitter load circuit may be utilized to provide a unidirectional centering current in the horizontal windings of the receiver's deflection yoke, if electrical centering is desired in the receiver.

A primary object of the present invention is to provide a television scanning circuit arrangement which facilitates the energization of low power stages in a television receiver.

A further object of the present invention is to provide a novel and improved deflection output circuit for a transistorized television receiver, which may effectively serve as a D.C.-to-D.C. transformer to facilitate the serving of the receiver's low voltage power supply requirements.

Another object of the present invention is to accomplish a low voltage power supply function in the transistorized deflection output circuit of a television receiver, additionally establishing thereby a source of horizontal deflection centering current.

Figure 2:
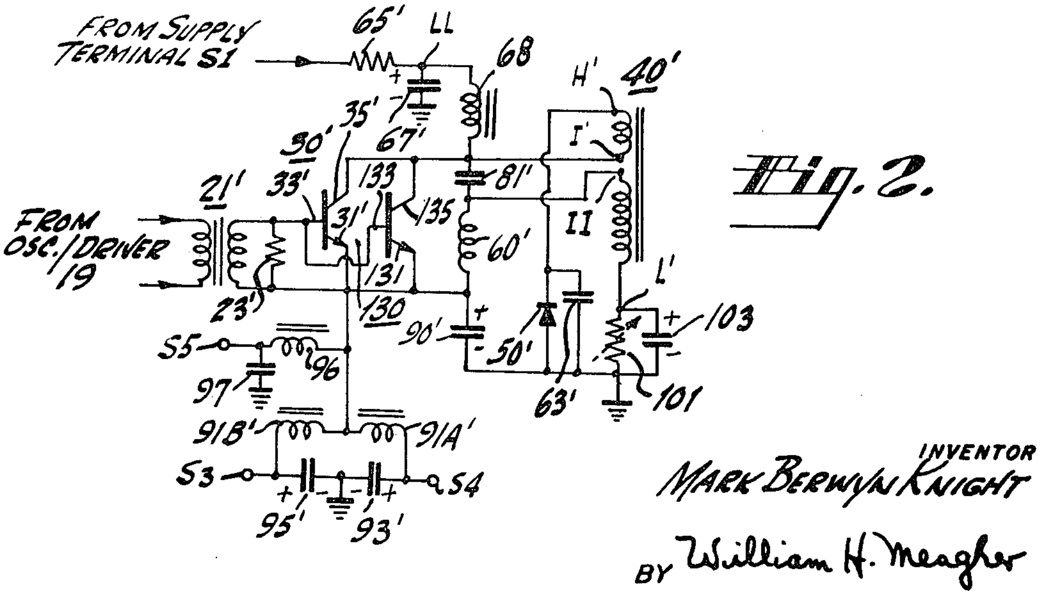

Other objects and advantages of the present invention will be readily recognized by those skilled in the art after a reading of the following detailed description and an inspection of the accompanying drawing in which:

FIGURE 1 illustrates, in partial block and partial schematic form, a color television receiver incorporating a scanning and power supply system embodying the principles of the present invention; and FIGURE 2 illustrates schematically a variation of the scanning and power supply system of FIGURE 1 incorporating the centering feature of the present invention.

In FIGURE 1, major circuit segments of a color television receiver are represented by a block designated 11. Color signal outputs of the receiver circuits 11 are illustrated as being conveyed to a color image reproducer 13, which, utilizing a suitable device, such as a tri-beam, shadow-mask color kinescope, converts the color signal outputs of the receiver circuits 11 to a viewable color image.

A pair of D.C. operating potentials for the receiver circuits 11 and the reproducer 13 are derived from respective output terminals S1 and S2 of a low voltage power supply unit 15, which develops these potentials from the alternating current output of a source 17 (e.g., a power line source). The high voltage power requirements of reproducer 13, and additional low power requirements of the receiver circuits 11, are satisfied by outputs developed at high voltage output terminals G and U, and low voltage output terminals S3 and S4, respectively, of an horizontal deflection output system illustrated schematically and to be subsequently described. The deflection output system is driven by a horizontal oscillator/driver unit 19, shown in block form; suitable synchronization of the horizontal oscillator operation is effected by conveying to unit 19 via lead Z horizontal synchronizing signals derived from an appropriate segment of the receiver circuits 11.

A transformer 21 supplies a suitable line frequency drive waveform from the oscillator/driver unit 19 to the input circuit of the horizontal output transistor 30, illustratively of the NPN type. The secondary winding of transformer 21, which is shunted by a resistor 23, is directly connected between the emitter 31 and the base 33 of output transistor 30. The collector 35 of output transistor 30 is directly connected to an intermediate tap I on the primary winding of a horizontal output/high voltage transformer (hereinafter referred to as "flyback transformer") 40, the primary winding having respective end terminals H and L. An operating D.C. potential is supplied to collector 35 from terminal S1 of the power supply unit 15 via a decoupling resistor 65 in series with a portion (I–L) of the flyback transformer 40 primary winding, the decoupling resistor 65 being connected between the terminal S1 and the (low A.C. potential) end terminal L of the primary winding. A filter capacitor 67, connected between terminal L and ground, completes the decoupling circuit.

A damper diode 50 has its anode directly connected to a point of reference potential (e.g., chassis ground) and its cathode directly connected to the high potential end terminal H of the primary winding of flyback transformer 40. The horizontal deflection windings of the receiver's deflection yoke are represented in the schematic drawing by coil 60. The series combination of coil 60 and S-shaping capacitor 61 is directly connected between terminal H and chassis ground, in shunt with damper 50; also in shunt with damper 50 is a flyback tuning capacitor 63.

Transistor 30 and damper diode 50 cooperate in the sawtooth current energization of yoke windings 60 in accordance with familiar reaction scanning principles. Current flow in a first direction through the yoke occurs during an end-of-trace interval primarily controlled by the conduction of transistor 30, whereas current flow in the opposite direction through the yoke occurs during the beginning-of-trace interval primarily controlled by the conduction of damper diode 50. During the end-of-trace interval direct current drawn by conducting transistor represents a drain on supply 15, whereas during the beginning-of-trace interval the conduction of damper diode returns power to the supply 15.

An additional diode 80 has its anode connected to primary winding terminal H and its cathode connected via a capacitor 81 to chassis ground. Diode 80, performing a protection function for output transistor 30, also serves to develop a D.C. potential at its cathode. This potential appearing at output terminal G, connected via dropping resistor 83 to the junction of diode 80 and capacitor 81, is supplied to reproducer 13 as a moderately high supply voltage for the reproducing device. Illustratively, it may be utilized as a screen grid potential supply, where the device is of the aforementioned shadow-mask kinescope variety.

The synchronized waveform supplied by unit 19 serves to drive transistor 30 sharply into cut off during the horizontal blanking interval of the received signal. The resultant sudden collapse of the magnetic field of the windings of transformer 40 and yoke 60 develops a large flyback voltage pulse across the transformer primary winding. A stepped-up version of the flyback pulse appears across the high voltage secondary winding 40S of transformer 40, and is rectified by diode 70 to develop a high voltage output at terminal U, suitable as a final accelerating potential for the image reproducer 13.

A filter capacitor 90 provides a low A.C. impedance between the emitter 31 of transistor 30 and chassis ground, effectively grounding the emitter for the deflection waves. A charge is developed across capacitor 90 by the emitter current of transistor 30. A supply terminal S3 is connected via a decoupling choke 91B to the emitter 31 and an additional supply terminal S4 is connected to the emitter 31 via a second choke 91A; chokes 91A and 91B may in practice be constituted by a single tapped choke. Respective filter capacitors 95 and 93 provide low A.C. impedances between the respective terminals S3 and S4 and ground. A substantially resistive D.C. load, constituted by a plurality of low power transistor stages of the receiver circuits 11, is effectively shunted across capacitor 90 by connection of certain of these stages via lead T3 to terminal S3 for derivation of operating potential for such stages, and by connection of the remainder of these stages via lead T4 to terminal S4 for derivation of operating potential for the latter stages.

The magnitude of the supply potential developed at emitter 31 is related to the magnitude of the (decoupled) supply potential at terminal L in substantially the same ratio as the number of turns of the H–I segment of the transformer primary winding bear to the total number of turns of the primary winding. The direct current drawn by the low power stages via terminals S3 and S4 corresponds to the average current of output transistor 30, whereas the current drawn from supply 15 via terminal L corresponds to the average current of output transistor 30 minus the average current of the damper diode 50. Thus, it may be seen that the deflection output circuit in the illustrated configuration effectively serves as a D.C.-to-D.C. transformer function, accepting a high voltage, low current input and delivering a low voltage, high current output.

As noted above, the degree of "tapping up" of damper 50 on the transformer 40 primary (relative to the transistor drive tap I) is determinative of the magnitude of the supply potential developed at emitter 31, and accordingly should be chosen in consideration of the operating potential requirements of the low power receiver stages. In brief explanation of this relationship, it may first be noted that the voltage across the full primary winding (essentially inductive) is equal to $L_{H-L}di/dt$, with $L_{H-L}$ being the inductance of the yoke/primary combination and $di/dt$ being the time derivative of the sawtooth current wave. With the current $i$ through the winding changing substantially linearly during the trace portion of the sawtooth current cycle, the time derivative thereof is substantially constant, wherefore the primary voltage is a substantially constant voltage. This constant voltage must substantially equal the supply potential at terminal L (note that during conduction of diode 50, the full primary winding is effectively placed directly across the terminal L supply). The substantially constant voltage appearing across the I–L segment of the primary winding during trace is equal to $L_{I-L}di/dt$; this is less than $L_{H-L}di/dt$ by an amount corresponding to $L_{H-I}di/dt$. During transistor conduction, the voltage drop across the emitter load circuit plus $L_{I-L}di/dt$ must substantially equal the supply potential at terminal L, assuming relatively little voltage drop across the conducting transistor 30; thus, the voltage at emitter 31 substantially equals the difference between $L_{I-L}di/dt$ and the supply potential at terminal L, and thus substantially equals $L_{H-I}di/dt$, or $(L_{H-I}/L_{H-L})\times$(supply potential at terminal L).

In a particular working embodiment of the circuitry of FIGURE 1, comprising a color receiver employing a type 15LP22 color kinescope, the supply potentials developed at terminals S1, S2, S3 and S4 were +125 volts, +230 volts, +22 volts and +21 volts, respectively. The color video output stages of the receiver circuits 11 utilized the +230 volt supply. In addition to the discussed application of the +125 volt supply potential to the horizontal output stage, and the illustrated use of this supply potential for the horizontal oscillator/driver unit 19 (assuring self-starting), the audio output stage of receiver circuits 11 also utilized the +125 volt supply. The +22 volt potential at terminal S3 was supplied to all of the vertical deflection stages, with the exception of the vertical dicharge stage which utilized the supply potential at terminal L (actual voltage thereat varying with beam current, whereby compensation is obtained in vertical sawtooth wave generation for the tendency of picture height to change with brightness setting). The remaining low power stages of the receiver circuits utilized the +21 volt supply potential at terminal S4. With the demands on the supply unit 15 thus satisfied, per use of the present invention, by generation of the +125 and +230 volt supply potentials, a "transformerless" power supply conveniently served as supply unit 15.

FIGURE 2 is a partial schematic illustration of a modification of the circuitry of FIGURE 1. Where circuit elements of the modification perform functions comparable to those of elements of the FIGURE 1 circuit, they bear the same reference numeral plus a prime designation.

As in FIGURE 1, a transformer 21' couples a drive waveform to the input circuit of the horizontal output stage. The single output transistor 30 of FIGURE 1 is supplanted by a pair of output transistors 30' and 130, connected in parallel (i.e., with like electrodes of each transistor directly connected together). The secondary of transformer 21', shunted by resistor 23, is directly connected between bases 33', 133 and emitters 31', 131.

A decoupled supply potential derived from terminal S1 of unit 15 (FIG. 1) is developed at the junction of decoupling resistor 65′ and filter capacitor 67′, and corresponds to the supply potential developed at terminal L in FIGURE 1. However, in contrast with FIGURE 1, the collector connection to such supply terminal is not made via an output transformer winding, but rather via a separate choke 68. This relaxes requirements for the output transformer 40′, which is not required to pass the full supply current as was required in FIGURE 1. The choke feed also facilitates an electrical centering arrangement to be subsequently described.

As in FIGURE 1, the damper diode 50′ is tapped up on the primary winding of transformer 40′, being connected to a terminal H′ of higher A.C. potential than the collector drive point I′. Flyback tuning capacitor 63′ shunts the damper 50′ as in FIGURE 1. However, the series combination of S-shaping capacitor 81′ and yoke windings 60′ no longer directly shunts the damper, but rather is connected directly between collectors 35′, 135 and emitters 31′, 131 of the output transistors. The disposition of the series combination is such that the capacitor 81′ is disposed between the collectors 35′, 135 and the yoke winding 60′, isolating the winding 60′ from the supply current through choke 68.

Also in contrast with FIGURE 1, a galvanic connection is not provided betwen the H′–I′ segment of the transformer primary winding and the remaining winding segment, the S-shaping capacitor 81′ being interposed between the "bottom" (I′) of winding segment H′–I′ and the "top" (II) of the remaining winding segment (II–L), thus isolating the winding segment II–L from the choke 68 current.

As in FIGURE 1, a filter capacitor 90′ is connected between the output transistor emitters 31′, 131 and ground; the D.C. load, constituted by low power stages of receiver circuits 11 (FIG. 1), is effectively shunted across the filter capacitor 90′. Use of decoupling networks 91B′, 95′ and 91A′, 93′ in the connections to the receiver circuits 11 is as in FIGURE 1, supplemented by a third decoupling network (series choke 96, shunt filter capacitor 97) providing an additional supply terminal S5 at the junction of elements 96, 97.

In a departure from the FIGURE 1 arrangement, the low A.C. potential end terminal L′ of the transformer 40′ primary winding is returned to ground via a resistor 101 shunted by a filter capacitor 103. It will be seen that a direct current path is provided between the emitters 31′, 131 of the output transistors and ground via the added resistor 101 in series with the primary winding segment II–L and the yoke windings 60′. The value of resistor 101 is determinative of the magnitude of direct current that passes through the yoke windings 60′ via the noted path. The value may be chosen to provide a small centering shift of the raster displayed by the image reproducer 13; the direction is such as to tend to compensate for the tendency (due to familiar linearity deficiencies) of the information center of the picture to be slightly laterally displaced from the physical center of the display. If desired, resistor 101 may be variable (as suggested by the dotted-line arrow in the drawing) to permit adjustment of the centering effect.

It will be noted that the low voltage supply provided at the output transistor emitters effectively serves as the source of the above-described centering current. Where the average current of the output transistors exceeds the current demands of the low power stages of receiver circuits 11, and where it is desired to utilize choke feed for transformer design simplification, the centering feature above described is obtained at virtually no cost, merely by properly rearranging circuit elements already required.

In a particular working embodiment of the FIGURE 2 modification of the FIGURE 1 receiver (wherein the receiver employed a 25XP22 color kinescope) the supply potentials at terminals S1, S2, S3, S4 and S5 were approximately +100 volts, +270 volts, +22 volts, +22 volts and +21 volts, respectively. The S1 and S2 supply potential utilizations were as in the previously described receiver example, with the added utilization of the S2 supply for a vertical blanking stage feeding color kinescope gun electrodes. As previously, S3 was the supply point for vertical stages other than the discharge stage (which, in the present example, derived charging potential from point LL, for previously discussed reasons). The sound channel stages (including the audio output stage), in the present example, derived supply potential from terminal S4, with the remaining low power stages of receiver circuits 11 utilizing the supply potential at S5. With current drains via S3, S4 and S5 approximately equal to 450 ma., 400 ma., and 200 ma., and with average transistor current about 1.2 amperes, approximately 150 ma. was available for the centering current described above. As in the previous example, limiting the demands on supply unit 15 to voltages of the order of +100 volts and +270 volts, per practice of the present invention permitted use of a "transformerless" power supply as the unit 15.

A contemplated alternative (not illustrated in the drawing) to the FIGURE 2 circuit, of advantage where a variable centering effect is desired, will now be briefly described. In such alternative circuit, the resistor 101 would be replaced by a network as follows: a potentiometer having one fixed terminal connected to emitters 31′, 131 and its other fixed terminal connected to the terminal L′, with its variable tap returned to ground via a fixed resistor (shunted by a filter capacitor). As the tap is moved away from the emitters, centering current through yoke windings 60′ increases, and vice versa. The variation of centering current in yoke winding 60′ is achieved in this alternative circuit without varying the loading on the emitter circuit supply.

A common advantage to all of the discussed circuit arrangements is the easing of the voltage requirements on the output transistors despite the use of "transformerless" low voltage supply units. That is, the drop across the emitter load permits lower voltage rating output transistors to be employed with off-the-line rectifier supply potentials (without wasteful voltage dropping elements being required).

What is claimed is:

1. In a television receiver including a plurality of low power signal processing stages, and a low voltage power supply, the combination comprising:
- a deflection output transistor having base, emitter and collector electrodes;
- a drive input circuit for said transistor coupled between said base and emitter electrodes;
- a damper diode;
- a deflection output transformer including a primary winding having a plurality of terminals of differing A.C. potential;
- means providing direct current conductive paths between said collector electrode and said low voltage power supply, and between said damper diode and said low voltage power supply;
- and means for deriving operating potentials for said plurality of signal processing stages from said deflection output transistor comprising a capacitor connected between said emitter electrode and a point of reference potential, and means for effectively shunting said signal processing stages across said capacitor;
- said collector electrode being connected to a first one of said winding terminals, and said damper diode being connected to a second winding terminal of higher A.C. potential than said first winding terminal.

2. Apparatus in accordance with claim 1 wherein said direct current conductive path between said collector electrode and said supply includes a portion of said primary winding.

3. Apparatus in accordance with claim 1 wherein said direct current conductive path between said collector electrode and said supply includes a choke independent of said primary winding.

4. In a television receiver including a plurality of signal processing stages, the combination of:

a deflection output transistor having base, emitter and collector electrodes;

a deflection output transformer having a primary winding with a pair of end terminals and an intermediate tap;

said collector being connected to said tap;

a damper diode;

a transformerless low voltage power supply;

means providing a direct current conductive connection between said supply and said collector;

means providing said emitter with a D.C. load comprising said plurality of signal processing stages;

means for effectively A.C. grounding one of said winding end terminals;

and means for connecting said damper diode to the other of said winding end terminals.

5. In a television receiver including a plurality of low power signal processing stages, and a low voltage power supply, the combination comprising:

a deflection output transistor having base, emitter and collector electrodes;

a drive input circuit for said transistor coupled between said base and emitter electrodes;

a damper diode;

a deflection output transformer including a primary winding having a plurality of terminals of differing A.C. potential;

means providing a direct current conductive path, independent of said winding, between said collector electrode and said low voltage power supply;

and means for deriving operating potentials for said plurality of signal processing stages from said deflection output transistor comprising a capacitor connected between said emitter electrode and a point of reference potential, and means for effectively shunting said signal processing stages across said capacitor;

said collector electrode being connected to a first one of said winding terminals, and said damper diode being connected to a second winding terminal of higher A.C. potential than said first winding terminal;

a deflection yoke winding;

an additional capacitor;

the series combination of said yoke winding and additional capacitor being connected between said emitter and collector electrodes;

and means including a resistor for establishing a direct current path between said emitter and said point of reference potential which includes said yoke winding and a segment of said transformer winding.

6. Apparatus in accordance with claim 5 including means for varying the value of resistance presented by said resistor in said direct current path between said emitter and said point of reference potential whereby a facility for deflection centering adjustment is provided.

7. In a television receiver including a plurality of signal processing stages requiring respective unidirectional operating potentials in a first range of magnitudes, the combination comprising:

a low voltage power supply for deriving from an A.C. input unidirectional potential outputs in a second range of magnitudes excluding and exceeding said first range of magnitude;

a deflection output transistor having base, emitter and collector electrodes, said output transistor having a voltage rating of a magnitude falling between said first and second ranges;

a drive input circuit for said transistor coupled between said base and emitter electrodes;

a deflection output transformer including a primary winding having a plurality of terminals of differing A.C. potential, said collector electrode being connected to one of said winding terminals;

direct current conductive means for connecting the emitter-collector path of said output transistor in series with a D.C. load constituted by said plurality of signal processing stages and for applying a unidirectional potential output of said supply across the series combination of said transistor path and load;

and a damper diode connected to a second winding terminal of higher A.C. potential than said one winding terminal.

8. Apparatus in accordance with claim 7 wherein said direct current conductive means includes a segment of said primary winding extending between said one winding terminal and a third winding terminal of lower A.C. potential than said one winding terminal.

References Cited

UNITED STATES PATENTS

| | | | |
|---|---|---|---|
| 3,129,354 | 4/1964 | Hellstrom | 315—27 |
| 3,205,401 | 9/1965 | Fyler et al. | 315—27 |

RICHARD A. FARLEY, *Primary Examiner.*

J. G. BAXTER, *Assistant Examiner.*

U.S. Cl. X.R.

315—19